Sept. 16, 1952     G. F. MAGLOTT     2,610,647
PILOT OPERATED FLUID PRESSURE CONTROL VALVE
Filed Aug. 4, 1947
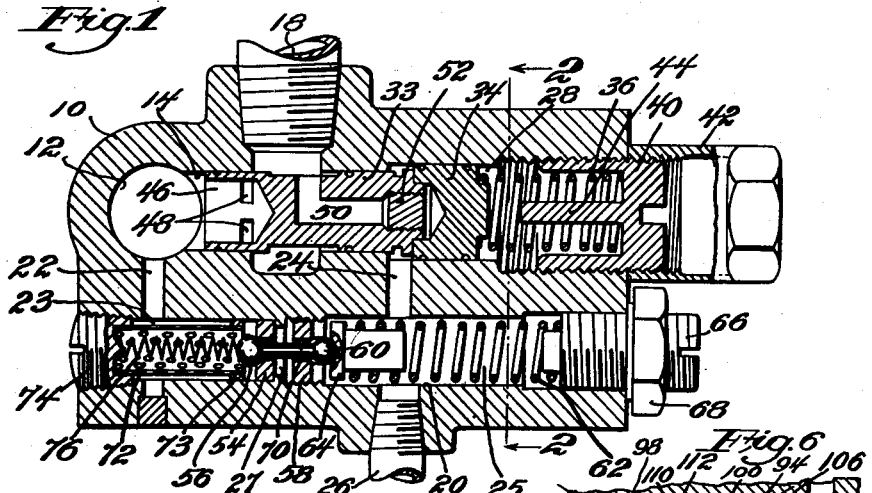
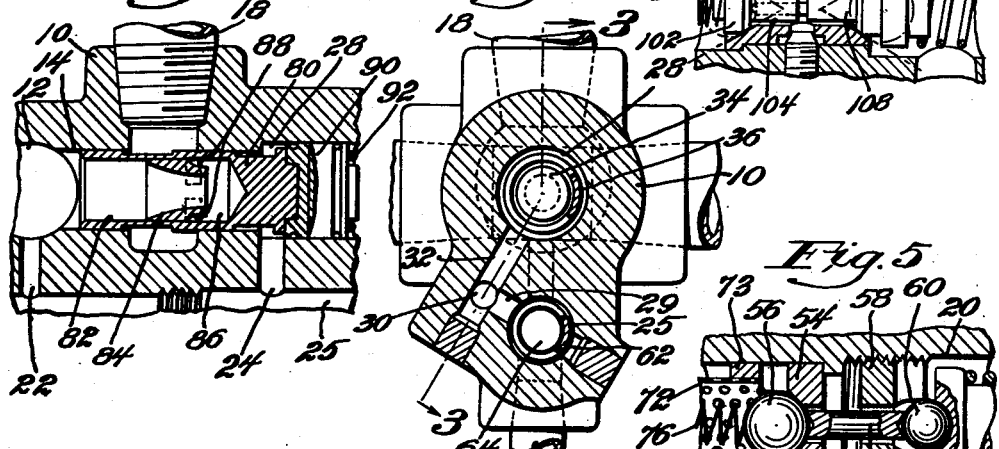
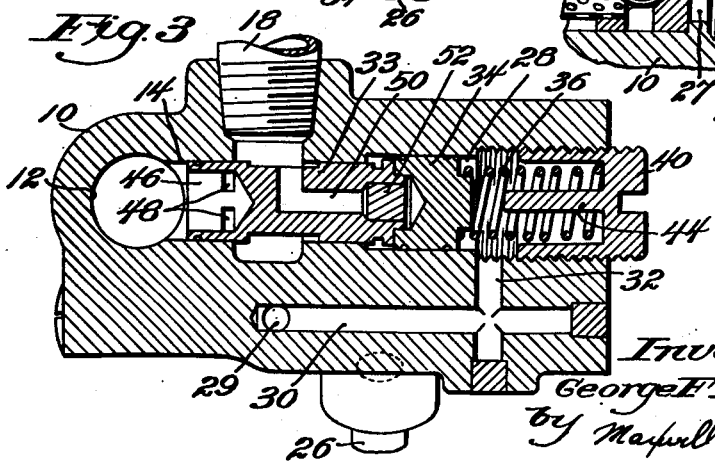
Inventor
George F. Maglott
by Maxwell Fish
Att'y.

Patented Sept. 16, 1952

2,610,647

UNITED STATES PATENT OFFICE 2,610,647

PILOT OPERATED FLUID PRESSURE CONTROL VALVE

George F. Maglott, Wrentham, Mass., assignor to Brown and Sharpe Manufacturing Company, a corporation of Rhode Island Application August 4, 1947, Serial No. 765,862

6 Claims. (Cl. 137—487)

The present invention relates to improvements in fluid pressure control devices of the general type adapted for controlling the pressure of a substantially non-compressible liquid medium, and is concerned more particularly with a fluid pressure control valve of the general description having a main valve mechanism and a pilot valve mechanism for directing the fluid pressure to shift the main valve mechanism between open and shut-off positions.

This application is a continuation in part of the abandoned application of George F. Maglott, Serial No. 543,133, filed July 1, 1944, for Fluid Pressure Control Devices.

It is a principal object of the present invention to provide a novel and improved valve mechanism of this general description including the pilot valve mechanism which is well adapted for controlling a substantially non-compressible liquid pressure medium such as oil in a system to maintain a close regulation of the liquid pressure.

More specifically, it is an object of the invention to provide a novel and improved fluid pressure control valve which is well adapted for effecting a straight line regulation of a liquid medium such as oil under heavy pressure, is sensitive to slight changes in the pressure to be regulated, is simple in construction, and at the same time is so constructed and arranged as to insure a smooth flow of the liquid medium through the valve with a minimum of erosion and wear in the mechanism, and with a minimum chance of blocking or sticking of the valve.

With these and other objects in view as may hereinafter appear, a feature of the invention consists in the provision with a main valve having a regulating chamber, of a novel pilot valve mechanism for controlling the application of pressure to the regulating chamber of the main valve, which comprises a pair of oppositely disposed valves including two valve elements and a spacer member inserted therebetween, the external faces of the two valve elements being connected respectively with the pressure to be regulated and with exhaust, and the internal faces of the valve elements being connected respectively with the regulating chamber of the main valve. The pilot valve mechanism described weighs directly against the main pressure to be regulated, and in turn controls the regulating pressure to the main valve so that the main valve member is acted upon in opposite directions by two inversely varying forces. In accordance with the invention, for use in the pilot mechanism above described, line contact valves, preferably ball valves, are employed so that the pressure areas on opposite sides of each valve when closed are equal in size. The pilot valve mechanism is thus made immediately responsive to slight changes in the pressure acting on opposite sides of the ball valves. During operation of the valve mechanism to control the pressure of a non-compressible liquid medium such as oil, the positions of the main valve member and of the pilot valve members tend to become rapidly stabilized as the pressure to be regulated reaches the desired level. Any tendency of the pilot valve mechanism to oscillate between alternative open and closed positions is substantially damped out, and an extremely close straight line regulation of the pressure to be regulated is achieved.

The several features of the invention consist also in the devices, combinations and arrangement of parts which together with the advantages to be obtained thereby will be readily understood by one skilled in the art from the following description taken in connection with the accompanying drawing, in which Fig. 1 is a sectional view in side elevation of a fluid pressure control valve in the nature of a fluid pressure regulating valve comprising a main valve mechanism and a pilot valve mechanism which embodies in a preferred form the several features of the invention; Fig. 2 is a sectional view taken on the line 2—2 of Fig. 1, illustrating particularly the conduit connecting the regulating chamber of the pilot valve mechanism with the regulating chamber of the main valve mechanism; Fig. 3 is a sectional view of the valve assembly shown in Figs. 1 and 2, and is taken on a line 3—3 of Fig. 2; Fig. 4 is a detail sectional view in elevation showing the valve structure of the preceding figures but with a different main valve piston adapting the valve mechanism for use as a reducing valve; Fig. 5 is a detail sectional view on an enlarged scale of the ball valves and spacer member of the pilot valve mechanism shown in Fig. 1; and Fig. 6 is a detail sectional view on an enlarged scale of the valves and spacer member of the pilot valve mechanism, but with a different type of valve member from the balls shown in the preceding figures.

The valve mechanism illustrated as embodying in a preferred form the several features of the invention is of the general type comprising a main valve member shiftable between open and shut-off positions so as to provide a variable throttling of the flow through the valve and thus to regulate the pressure in the actuating pressure conduit, and a spring-actuated pilot valve through which fluid pressure is directed to control the action of the main valve member. Applicant's improved valve mechanism is particularly adapted for controlling liquid pressures in an oil distributing system, and is illustrated in the drawings in two alternative forms for use as a pressure regulating valve and as a pressure reducing valve. The pilot valve mechanism employed for controlling the operation of the main valve comprises a chamber or conduit through which fluid pressure is directed into a control chamber against the main valve member, two oppositely disposed ball-type valves arranged for line contact with their seating members which connect the chambers respectively with the pressure to be regulated and with exhaust, and a spacer member which acts to move one valve member off its seat before the other is completely closed.

Referring specifically to the drawing, the control valve mechanism illustrated as embodying in a preferred form the several features of the invention, in each of the forms shown comprises a valve casing 10 in which is formed a transversely extending conduit 12 which contains the fluid pressure to be regulated, and a longitudinally extending bore 14 which communicates with the conduit 12 and forms a cylinder to receive the movable element or plunger of the main valve of the device. The bore 14 is connected also with a vertically extending conduit 18 for an actuating pressure at a different level, which is arranged to be connected with or closed off from the conduit 12 by movement of the main valve member 33. In that form of the device particularly illustrated in Fig. 1, in which the valve mechanism is employed as a regulating valve, conduit 18 is connected with exhaust. In an alternative form of the device shown in Fig. 4 and hereinafter to be described, in which the valve mechanism is employed as a reducing valve, the conduit 18 is connected with supply pressure. An additional bore 20 which extends longitudinally of the casing provides a housing for the pilot valve mechanism of the device. A vertically arranged bore or drill 22 in the casing provides a connection between the conduit 12 containing the pressure to be regulated and pilot valve inlet chamber 23 provided within the left hand end of the bore 20. A second vertically arranged bore in the valve casing 10 provides an exhaust connection 24 from the main valve bore 14 to a pilot valve exhaust chamber 25 comprising the right hand end of the pilot valve bore 20, and also provides a conduit or passageway 26 leading from the pilot valve exhaust chamber 25 to exhaust or spill. The valve casing 10 is drilled also to provide a passageway which extends from a pilot valve regulating chamber 27 located centrally within the pilot valve bore 20 as hereinafter more fully set forth, to a regulating chamber 28 which comprises the right hand end of the main valve bore 14. This latter conduit, as best shown in Figs. 2 and 3, comprises a transverse drill 29 connecting the chamber 27 in the pilot valve bore 20 with a longitudinally extending drill 30 which in turn is connected by an upwardly extending drill 32 with the regulating chamber 28 of the main valve mechanism. The valve mechanism shown in Figs. 1, 2, 3 and 5, as embodying in a preferred form the several features of the invention, is particularly constructed and arranged for use as a regulating valve. In this form of the device the main valve mechanism chosen for illustration, comprises the bore 14 within which is supported an axially movable control element or plunger 33, an auxiliary fluid pressure actuated piston 34 which is supported to slide in a somewhat enlarged portion of the bore 14 for engagement against the rear end of the plunger 33, and a light compression spring 36 which is seated at one end against the auxiliary plunger 34 and at its other end within the recess of a socket member 40 screw-threaded into the end of the bore 14. The end of the bore 14 containing the main plunger assembly is enclosed by means of a locking nut in the form of a cap 42 which is screw-threaded to and locks the socket member 40. A stop member in the form of a stem 44 formed on the socket member 40 and projecting axially through the spring 36 acts to prevent excessive movement of the plunger 33 and piston 34 to the right.

Connection is provided between the conduit 12 containing the pressure to be regulated and the exhaust conduit 18 through an axial bore 46 formed in the forward end of the plunger 33 and four transverse ports 48 connecting the bore 46 with the outer periphery of the plunger 33. Movement of the plunger or control element 33 axially is effective to open or close off the passage through the ports 48 to the exhaust conduit 18. In the position shown in Fig. 1, the passageway between conduit 12 and conduit 18 is closed off. When the valve is operatively connected, however, the plunger 33 will variably assume a position between fully closed and fully open positions according to the demands of the hydraulic system which the valve governs, in which position the ports 48 will be connected to the conduit 18, allowing the excess of the fluid above that required to escape into the exhaust conduit 18 through ports 48. The control element 33 is formed also with a passage 50 connecting the exhaust conduit 18 with the rear end of the plunger 33. In the embodiment of the invention illustrated in Fig. 1, this passageway is closed off by means of a plug 52. The arrangement of the exhaust passage 24 with relation to the auxiliary piston 34 is such as to cause any fluid which seeps past the control element 33 and piston 34 to be collected and drawn off to the spill or exhaust.

The pilot valve mechanism which forms more specifically the subject-matter of the present invention, as previously pointed out, is housed within the bore 20 and consists of the inlet chamber 23, the regulating chamber 27 and the exhaust chamber 25, these chambers being separated from one another by two line contact ball valves formed with disk seats which serve to partition the several chambers from one another within the bore 20. The inlet chamber 23 is separated from the regulating chamber 27 in the construction shown in Figs. 1 and 5, by means of a ball valve which comprises a disk seat 54 having a plane conical seating surface and a ball member 56 which is arranged to be forced yieldingly against its seat by the pressure to be regulated passing from conduit 12 through conduit 22 into the inlet chamber 23. The regulating chamber 27 of the pilot valve mechanism is separated from the exhaust chamber 25 by means of a second ball valve comprising a disk seat 58 with an edge seating surface screw-threaded into the inner wall of the bore and a ball 60 loosely supported therein and arranged to be forced yieldingly against its seat by means of an adjustable coil spring 62 seated at one end against a bearing member 64 which engages the ball 60 and at its other end against a plug 66 screw-threaded into the right hand end of the bore 20 and held in its adjusted position by means of a locking nut 68. Specifically in accordance with the invention, in the construction shown in Figs. 1 and 5, the balls 56 and 60 and their seats are constructed to close with a line contact between the ball and seat members to provide substantially equal pressure areas at opposite sides of the line of contact. The balls 56 and 60 are separated from one another by a spacer member 70 which is of smaller diameter than the valve openings to avoid interference with the flow of pressure fluid through the valves and of such length that movement of either ball valve to its closed position forces the other ball to a raised position. A strainer is provided in the inlet chamber 23 to the pilot valve mechanism in the form of a perforated tube 72 provided at its inner end with a spacing collar 73 and arranged at its outer end to be seated in a recessed plug 74 which closes the left hand end of the bore 20. A light compression spring 76 coiled within the tube 72 acts to retain the ball 56 in its operative position.

The operation of the regulating valve mechanism above described as shown in Figs. 1, 2, 3 and 5 of the drawing, will be described as follows: The regulation of the pressure to be regulated in conduit 12 is determined by the adjustment of the compression spring 62 of the pilot valve mechanism. The pump which supplies the regulating valve furnishes a greater supply of fluid than is required for the operation being performed, and the purpose of the valve, when acting as an excess pressure regulator, is to spill the excessive liquid from and above that required by the hydraulic system, in such a manner as to maintain a constant head pressure. This is done by automatically controlling a variable throttling member 33. It is assumed that the pressure to be regulated in the conduit 12 threatens to drop below the desired value because of some change in the hydraulic system being supplied, such as by the opening of a valve to an additional operating line. The spring 62 immediately acts on ball 60 to urge it closer to its seat, throttling down the exhaust connection from the regulating chamber 27 of the pilot valve mechanism to the exhaust chamber 25. The spacer member 70 acts at the same time to urge the ball 56 off its seat a corresponding amount to open a little wider the inlet connection to the regulation chamber 27 from conduit 12 and inlet chamber 23, so that the back pressure in the regulating chamber 28 of the main valve mechanism is instantaneously increased. With this construction in which the pilot valve mechanism weighs directly against the main pressure to be regulated, there is provided in the secondary, two inversely varying resistances so that the main valve member is acted upon in opposite directions by two inversely varying forces, the positions of the main valve member and of the pilot valve members become rapidly stabilized as the pressure to be regulated reaches the desired level. Only in the event of sudden changes in quantity flowing in the main line will the valve members of the pilot mechanism be caused to open and close alternately. The relatively small change in the position of the pilot valve members may, however, produce a relatively large amount of movement of the main valve element to adapt it to the conditions encountered. The movement of the main valve member may vary from almost completely closed to wide open position. A very important advantage of applicant's novel pilot valve control for a main valve as above described, consists in the highly accurate control and stabilization of position of the main valve so that it can spill a proper amount of excess liquid from the amount used in the hydraulic system in order to maintain an accurate, straight-line regulation of the pressure therein.

The pilot valve of the present invention maintains a positively straight-line control of pressure in the system by an action which is the hydraulic equivalent of a Wheatstone bridge, in which any tendency to an unbalanced condition is immediately counteracted, the ball valves being extremely sensitive and resulting in a floating condition with both ball valves off their seats and with the pilot valve arrangement weighing directly against the pressure to be regulated. The action takes place instantaneously when there is any tendency for a change in pressure to occur, since the ball valves weigh directly against the pressure to be regulated, and there is no time delay, or cycling action, with respect to the main throttling valve plunger 33. For the sake of indicating the clearance between the ball valves and their seats, in Figs. 1 and 5, they have been shown exaggerated, with ball 60 a comparatively great distance off its seat, and ball 56 seated. In actual operation, as already explained, both valves are off their seats and the condition is more nearly as shown in Fig. 6, where the small distance between both valves and their seats would be difficult to indicate.

Applicant has found that a valve mechanism constructed and arranged to operate in this manner is capable of maintaining an extremely accurate and constant regulation of the pressure to be regulated in the conduit 12. The construction illustrated including particularly the ball valves and the spacer member 70 has the further advantage that it is simple, is not subject to erosion or wear, and does not include any small passageways or restrictions in which impurities of the fluid medium might become lodged with consequent interference with the continued and efficient operation of the mechanism. The construction of the pilot mechanism in which the valve members 56 and 60 are independently movable away from one another is of advantage also in that exhaust valve member 60 is permitted to open freely to its fullest extent to provide for the rapid exhaust from chambers 28 and 27 in the event of a heavy surge of pressure which would cause a rapid movement of the control element 33 to the right.

While in the illustrated embodiment of the invention, the ball 56 is shown as being somewhat larger than the ball 60, it will be understood that the invention is not limited to the particular construction shown, and that under different conditions it may be found advantageous to employ a ball 56 which is the same size or smaller than the ball 60. The sizes of the balls employed will depend upon the desired relationship in area of contact of the ball seats to one another, and upon the ratio of the main pressure to the spring 62.

Fig. 4 of the drawings illustrates particularly a reducing valve construction which is adapted to be controlled by the pilot valve mechanism of Fig. 1 of the drawings. In this instance, identical parts are employed including the casing 10 having formed therein the conduit 12 which contains the fluid pressure to be regulated and a second conduit 18 located at right angles thereto. In the illustration of Fig. 4, it is assumed, however, that the conduit 18 is connected with the pressure supply, and that a liquid medium such as oil is supplied through the conduit 18 under a pressure which is in excess of that which is to be produced by regulation in the conduit 12. As in the illustrations previously considered, the conduit 12 is connected by the drill 22 with the inlet chamber of the pilot valve mechanism, and spill conduit 24 connects with the exhaust chamber 25 of the pilot valve mechanism. For use in the reducing valve of Fig. 4, a somewhat different form of valve control element or plunger designated at 80 is employed. In this form of the plunger, a bore 82 extends from the left hand end thereof through a major portion of the length of the plunger. A chamber 86 at the inner end of the bore 82 is connected by means of ports 88 with the pressure inlet pipe 18. Movement of the main valve control element 80 to the right acts to throttle down the fluid delivered to conduit 12 by conduit 18, and movement of the control element 80 to the left acts to open the passageway through ports 88, chamber 66, and bore 82 to admit fluid pressure to the conduit 12. As in the embodiment of the invention illustrated in Fig. 1, the plunger or control element 80 is engaged by a secondary plunger 90 which is held in engagement with the element 80 by a light spring 92 and is acted upon by fluid pressure in the regulating chamber 28 as determined by the action of the pilot valve mechanism above described.

Fig. 6 of the drawings illustrates an alternative form of the pilot valve mechanism adapted for use in carrying out the present invention. In this form of the device the bore housing the pilot valve mechanism is shown with a slightly restricted central portion 94 having at one side thereof the chamber 23 and at the other side thereof the chamber 25 of the pilot valve mechanism above described. A valve cage is provided to be fitted within the restriction 94 comprising a sleeve member 96 having a conical-shaped inlet valve seat 98 at one end thereof, and a conical-shaped exhaust valve seat 100 at the other end thereof. An inlet valve member 102 having a spherical contact surface to provide a line contact with its seat as indicated by the construction lines in Fig. 6, and with one member 104 of a telescoping spacer element extending therefrom is fitted to the seat 98, and an exhaust valve member 106 having a spherical contact surface to provide a line contact with its seat and with the other member 108 of the telescoping spacer element extending therefrom, is fitted to the exhaust valve seat 100. As in the construction previously described, the spacer element comprising the telescoping members 104 and 108 is constructed and arranged to fit loosely within the sleeve member 96 to permit free passage of the fluid medium between the two valves. The spacer element is of such length as to cause one valve to be opened before the other is completely closed. The sleeve member 96 is provided with a plurality of lateral drills 110 connecting with an annular groove 112 formed in the outer periphery of the sleeve 96. The groove 112 corresponds with and performs the same function as the chamber 27 of the previously described construction shown in Figs. 1 and 5, and is connected with the passage 29 best shown in Figs. 2 and 3.

It will be understood that the invention is not limited to the specific embodiment shown, and that various deviations may be made therefrom without departing from the spirit and scope of the appended claims.

What is claimed is:

1. A fluid pressure reducing valve for effecting a constant straight line pressure regulation of a non-compressible liquid medium, which comprises a main valve assembly including a conduit containing the liquid under pressure to be regulated, and a second conduit connected with supply pressure, a liquid pressure control element movable in alternate directions to connect and to close off said conduits from one another and arranged to be acted upon by the pressure to be regulated in one direction to close off the conduits, and a pilot valve mechanism responsive to the pressure to be regulated for controlling the movement of the control element, said pilot valve mechanism comprising a valve chamber connected to direct liquid pressure against the control element in the opposite direction to urge the same in said opposite direction to connect said conduits, a valve for admitting the liquid under pressure to be regulated to said chamber, including a valve seat and a valve member seated by said pressure and having a line contact with the seat, a second valve including a valve seat and a valve member having a line contact therewith when seated and arranged when unseated to connect the chamber with an exhaust, an adjustable spring means acting to close the exhaust valve and to open the pressure admission valve against the pressure to be regulated, and a spacer element separating said valve members of a length to cause one valve to open by a small amount before the other is completely closed so that liquid pressure is admitted past said valves against inversely varying resistances, and the main valve member is acted upon in opposite directions by two inversely varying forces tending to stabilize at the desired level of pressure to be regulated, and to stabilize the positions of said main valve control element and pilot admission and exhaust valve members therewith.

2. A valve mechanism for effecting a constant straight line pressure regulation of a non-compressible liquid medium which comprises a valve assembly including a conduit connecting with the liquid under pressure to be regulated, a second conduit connecting with a pressure at a different level, and a liquid pressure control element movable in alternate directions to connect and to close off an opening between said conduits and arranged to be acted upon in one direction by the pressure to be regulated for conditioning said opening to reduce the pressure to be regulated, and a pilot valve mechanism responsive to the pressure to be regulated for directing liquid pressure against said control element in the opposite direction, which comprises a valve chamber arranged for directing liquid pressure against said control element in said opposite direction, an inlet ball valve for admitting the pressure to be regulated to said chamber, including a valve seat and a ball member having a line contact therewith when closed and movable outwardly of the chamber to open, an exhaust ball valve including a valve seat and a ball member having a line contact therewith when closed and movable outwardly of the chamber to open, spring means tending to close the inlet pressure ball valve, spring means tending to close the exhaust ball valve, a spacer member interposed between said balls of a length to cause one valve to open by a small amount before the other closes so that liquid pressure is admitted past said valves against inversely varying resistances, and the main valve control element is acted upon in opposite directions by two inversely varying forces tending to stabilize at the desired level of pressure to be regulated, and to stabilize the positions of said main valve control element and pilot admission and exhaust valve members therewith.

3. A valve mechanism for effecting a constant straight line pressure regulation of a non-compressible liquid medium which comprises a valve assembly including a conduit connecting with the liquid under pressure to be regulated, a second conduit connecting with an exhaust, and a liquid pressure control element movable in alternate directions to connect and to close off said conduits from one another and arranged to be acted upon in one direction by the pressure to be regulated for moving the control element to connect said conduits, a pilot valve mechanism responsive to the pressure to be regulated for directing liquid pressure against said control element in the opposite direction which comprises a valve chamber arranged for directing liquid pressure against said control element to move the control element in said opposite direction to close off said conduits from one another, inlet and exhaust ball valves to said chamber arranged opposite one another each having a valve seat and a ball member arranged to be moved from its seat outwardly of the chamber to open, said inlet and exhaust ball valves having the associated valve seats constructed for a closing line contact with the associated ball members to provide substantially equal pressure areas at opposite sides thereof, a spacer member interposed loosely through said seats between said ball members, of a length to permit one ball valve to close only after the other is opened by a small amount so that liquid pressure is admitted past said valves against inversely varying resistances, means connecting the inlet ball valve with the pressure to be regulated, and spring means acting to close the exhaust ball valve and to open the inlet ball valve, the arrangement of said valve assembly being such that the main valve member is acted upon in opposite directions by two inversely varying forces tending to stabilize at the desired level of pressure to be regulated, and to stabilize the positions of said main valve control element and pilot admission and exhaust valve members therewith.

4. A valve assembly for effecting a constant straight line pressure regulation of a non-compressible liquid medium which comprises a main valve assembly including a conduit containing the liquid under pressure to be regulated, a second conduit connecting with a pressure at a different level, and an axially shiftable main valve member having at one end thereof an axial bore connecting with said conduit containing the pressure to be regulated and side ports from said bore arranged for alternate positions of said main valve member to be connected with and to be shut off from said second conduit, and a pilot valve mechanism responsive to the pressure to be regulated for controlling movement of the main valve member comprising a valve chamber connected for directing liquid pressure to urge the main valve member against the pressure to be regulated, an inlet valve for admitting the liquid under pressure to be regulated to said chamber including a valve seat and a ball valve member constructed to close with a line contact therebetween, said ball member being movable from its seat outwardly of the chamber against the pressure to be regulated to open, an exhaust valve including a valve seat and a ball valve member constructed to close with a line contact therebetween, said ball member being movable from its seat outwardly of the chamber to open, spring means acting to close the exhaust valve, and a spacer element interposed between said balls of a length to cause one valve to open by a small amount before the other closes so that liquid pressure is admitted past said valves against inversely varying resistances, and the main valve member is acted upon in opposite directions by two inversely varying forces tending to stabilize at the desired level of pressure to be regulated, and to stabilize the positions of said main valve member and pilot admission and exhaust valve members therewith.

5. A valve mechanism for effecting a constant straight line pressure regulation of a non-compressible liquid medium which comprises a main valve assembly including a conduit containing the liquid under pressure to be regulated, a second conduit connected with a pressure at a different level, an axially shiftable main valve member having at one end thereof an axial bore connecting with and arranged to be acted upon by the pressure to be regulated, and side ports from said bore providing a variable opening to said second conduit conditioned by movement of said main valve member under the influence of the pressure to be regulated to reduce said pressure, and a secondary liquid pressure actuated piston arranged to act upon the opposite end of said member, and a pilot valve mechanism responsive to the pressure to be regulated for directing liquid pressure against said piston to move the piston and main valve member against the pressure to be regulated, which comprises a valve chamber arranged for directing liquid pressure against said piston, an inlet valve connecting the chamber with the pressure to be regulated and an exhaust valve arranged opposite one another, each having a valve seat and a valve member with a spherical contact surface providing a closing line contact with the seat, each valve member being arranged to be moved from its seat outwardly of the chamber to open, spring means tending to close the exhaust valve, and a spacer element interposed loosely through said seats separating said valve members of a length to cause one valve to open by a small amount only as the other is closed so that liquid pressure is admitted past said valves against inversely varying resistances, and the main valve member is acted upon in opposite directions by two inversely varying forces tending to stabilize at the desired level of pressure to be regulated, and to stabilize the positions of said main valve member and pilot valve members therewith.

6. A valve mechanism for effecting a constant straight line pressure regulation of a non-compressible liquid medium which comprises a main valve assembly including a main valve body having a connection with a pressure to be regulated and with a different level of pressure a main valve control element arranged to be acted upon in one direction by the pressure to be regulated for conditioning said control element and the connections controlled thereby to reduce said pressure and to be acted upon in the opposite direction by a control pressure for conditioning said control element to increase said pressure to be regulated, and a pilot valve mechanism constructed and arranged to weigh directly against the pressure to be regulated and to direct an opposing pressure against said main valve control element to increase said pressure to be regulated, said pilot valve mechanism comprising a chamber connected with said main valve body for directing a control pressure to act against the control element in the opposite direction, an inlet valve connecting the chamber with the pressure to be regulated and an exhaust valve arranged opposite one another, each having a valve seat and a valve member constructed to close with a line contact between the valve and seat members to provide substantially equal pressure areas at opposite sides of each of said valves when closed, and each valve member being arranged to be moved from its seat outwardly to open, and a spacer element interposed loosely through said seats separating said valve members of a length to cause one valve to open by a small amount before the other closes so that liquid pressure is admitted past said valves against inversely varying resistances, and the main valve member is acted upon in the two opposite directions by two inversely varying forces tending to stabilize at the desired level of the pressure to be regulated and to stabilize the positions of said main valve control element and pilot mechanism therewith.

GEORGE F. MAGLOTT.

REFERENCES CITED

The following references are of record in the file of this patent:

UNITED STATES PATENTS

| Number | Name | Date |
|---|---|---|
| 54,716 | Green | May 15, 1866 |
| 2,225,916 | Maglott | Dec. 24, 1940 |
| 2,393,571 | Schultz | Jan. 22, 1946 |

FOREIGN PATENTS

| Number | Country | Date |
|---|---|---|
| 8,799 | Great Britain | May 3, 1895 |
| 407,429 | Great Britain | Mar. 22, 1934 |